United States Patent [19]

Wilson

[11] Patent Number: 5,732,252
[45] Date of Patent: Mar. 24, 1998

[54] PROGRAM COUNTER SYSTEM CAPABLE OF INCREMENTING OR DECREMENTING AFTER A CONDITIONAL JUMP INSTRUCTION

[75] Inventor: David Wilson, Bedford, England

[73] Assignee: Texas Instruments Incorporated, Dallas, Tex.

[21] Appl. No.: 363,470

[22] Filed: Dec. 23, 1994

[30] Foreign Application Priority Data

Dec. 23, 1993 [GB] United Kingdom ............... 9326316

[51] Int. Cl.⁶ ......................................... G06F 9/32
[52] U.S. Cl. ........................... 395/583; 395/421.09
[58] Field of Search ................ 395/421.09, 800, 395/375, 583

[56] References Cited

U.S. PATENT DOCUMENTS

| | | | |
|---|---|---|---|
| 4,300,195 | 11/1981 | Raghunathan et al. | 395/800 |
| 4,723,258 | 2/1988 | Tanaka et al. | 377/111 |
| 4,959,797 | 9/1990 | McIntosh | 364/508 |
| 5,255,382 | 10/1993 | Pawloski | 395/402 |
| 5,410,721 | 4/1995 | Divine et al. | 395/800 |
| 5,469,550 | 11/1995 | Cezzar | 395/375 |

FOREIGN PATENT DOCUMENTS

| | | | |
|---|---|---|---|
| 3609056 A1 | 9/1986 | Germany | G06F 9/32 |
| WO-A-81 00473 | 2/1981 | WIPO | G06F 9/06 |

OTHER PUBLICATIONS

A. Meyer, "Chip Secrets," *Computer Technik*, No. 4, Apr. 1989, pp. 38–39. (in German).

*Primary Examiner*—Jack A. Lane
*Assistant Examiner*—Kevin Verbrugge
*Attorney, Agent, or Firm*—David S. Guttman; W. James Brady, III; Richard L. Donaldson

[57] ABSTRACT

This invention relates to an improved program counter which is capable of both incrementing the program count as well as decrementing the program count. This functionality provides improve implementation of decision trees in computer logic. The value of an integer is determined and compared to a predetermined constant. For each of, for example, three conditions a different decision is made. One of those decisions enables the program counter to continue on the current program list. A second decision moves the counter to a new list and causes decremental movement of the counter. The final decision enables movement to the same location as the second decision but causes incremental movement of the counter.

2 Claims, 1 Drawing Sheet

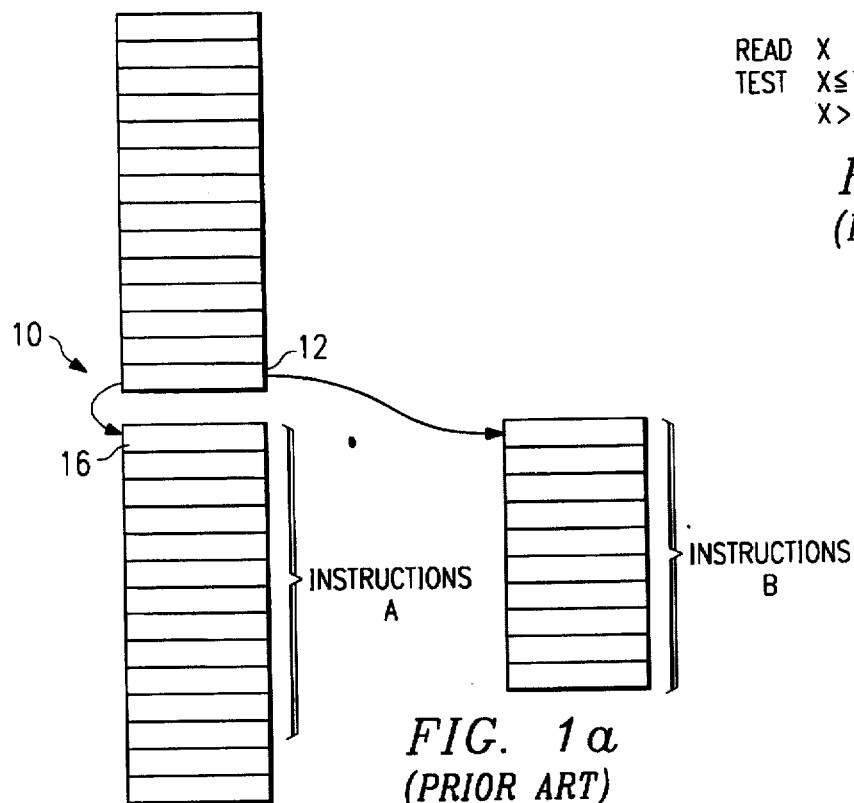
READ X
TEST  X≤Y — INSTRUCTION A
      X>Y — INSTRUCTION B
FIG. 1b
(PRIOR ART)
FIG. 1a
(PRIOR ART)
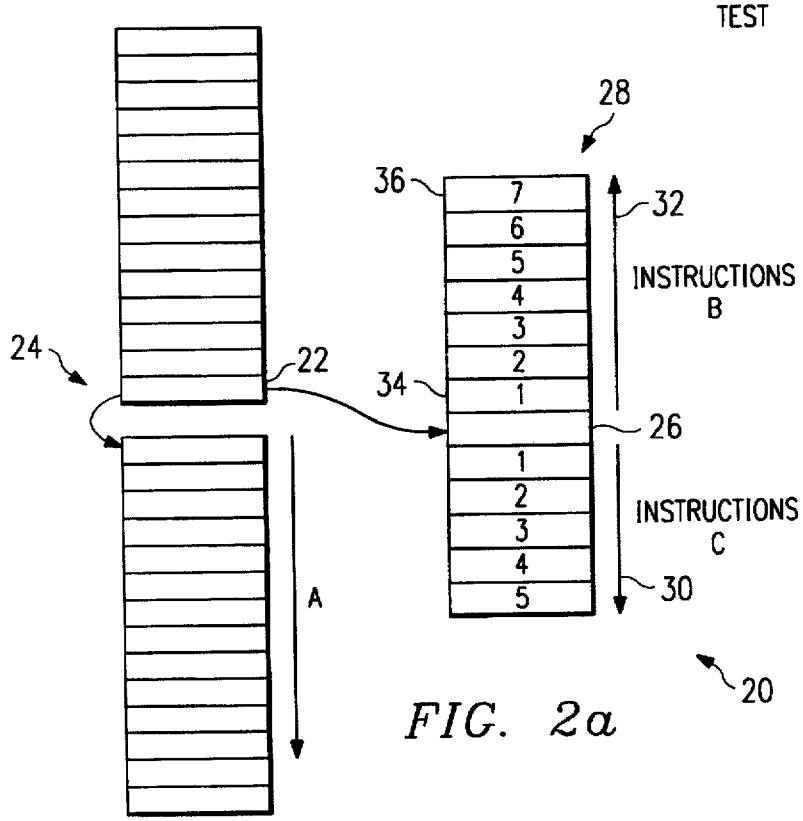
READ N
TEST  IF N=M INSTRUCTION A
      IF N<M INSTRUCTION B
      IF N>M INSTRUCTION C
FIG. 2b
FIG. 2a

PROGRAM COUNTER SYSTEM CAPABLE OF INCREMENTING OR DECREMENTING AFTER A CONDITIONAL JUMP INSTRUCTION

This invention relates to an improved program counter for a computer or microprocessor.

All microprocessors include a program counter which is designed to enable the microprocessor to read through the program code and execute the instructions contained therein. The program counter of a microprocessor is normally incremented every clock cycle assuming there are no other operations which might modify the effect of the program counter. Incrementing the program counter in this way leads to program execution proceeding from low memory address values to high values.

FIG. 1a shows a typical prior art system. At the end of a piece of code, indicated as 10, a test is performed the result of which decides where the PC should move to. For example, the test could be a comparison of two registers X and Y. Basic logic identifies whether X≦Y or whether X>Y. If X≦Y the PC moves to instructions A and these are carried out. If X>Y the PC moves to instructions B and these are carried out. FIG. 1b shows the decision tree for this mode of operation.

This type of operation is obviously somewhat restrictive. It is not possible to effect a decision which has more than two alternatives without having an extra decision making step. This will obviously cause a delay in the decision making processes.

One object of the present invention is to provide an improved system where at least some of the above mentioned delays are minimised, thereby providing a faster processor.

According to one aspect of the present invention there is provided a program counting system comprising, a program counter capable of either incrementing or decrementing it's address value.

This system has the advantage that the microprocessor can make one decision step which results in a greater option in possible instructions. This enables more complex decisions to be made while no increase in processing time is incurred.

According to a second aspect of the present invention there is provided a method of operating a program counter comprising the steps of reading a predetermined bit in a program listing, making a decision dependent on the value of the bit, causing the program counter to increment in response to a first decision, and causing the program counter to decrement in response to a second decision.

Reference will now be made, by way of example, to the accompanying drawings, in which:

FIG. 1a is a block diagram of a prior art system;

FIG. 1b is an assembly code decision table for the FIG. 1a system;

FIG. 2a is a block diagram of a system according to one aspect of the present invention; and FIG. 2b is an assembly code decision table for the FIG. 2a system.

The present invention provides a program counter shown generally as 20 in FIG. 2a. The program counter is capable of both incrementing and decrementing. This functionality allows the value of the program counter to be either increased or decreased depending on the processor state or a processor signal. This processor condition is determined by interpretation of a test in the list of code 24. The test tony, for example be a comparison of an integer value N, with a predetermined constant M. If N=M instructions A are carried out, if N<M instructions B are carried out and if N>M instructions C are carried out.

Instructions A cause the counter to continue down the first list of code. Instructions C cause the program counter to move to bit 26 in list of code 28 and read down the code as shown by arrow 30. Instructions B cause the counter to move to bit 26 and read up the code in the direction of arrow 32. To facilitate the counter being able to read up from bit 26 all the information in bits 34 to 36 are written in reverse order. In other words the higher addresses are in bit 34 and the lower addresses are in bit 36 and the program counter reads from high address values to lower address values. This is obviously the opposite direction to the direction a standard program counter will function.

Operating the program counter in this manner allows the decision to be made between one of three options rather than one of two options, without incurring a further decision making step. In other words there is a reduction in the number of cycles used to perform a decision tree. This provides an effective increase in the rate of operation of the counter when a decision step with greater than two options is made.

Using the invention the first branch of the decision as illustrated in FIG. 2b is performed as normal. The test in code 24 is used to determine whether the value of N is not equal to M. If this is the case the pointer is moved to bit 26. At bit 26, the destination of the branch, the program counter executes code in either the "up" or "down" direction depending on whether the value of N was greater than or less than M. For example "up" if N<M and "down" if N>M.

In order to read "up" the code it is necessary to reverse the code from the normal direction, as has been previously indicated. This can be accomplished by reversing the memory using for example the assembler or compiler.

In the embodiment of the invention above described, there are many possible variations which could be used instead of the specifics already disclosed. For example, the decision making tool may not need to depend on the relative values of N and M. They may instead be designed to depend on another set of logic. Obviously the invention is not restricted to assembly code, but may also be applied to any computer program in which a counter or pointer is present.

The above invention has been describe with reference to a microprocessor, however, it may be used on computers and microcomputers and any other type of processors.

I claim:

1. A program counter system regulated by a clock generating clock cycles, comprising:

a logic circuit for generating, in response to a single machine conditional jump instruction and within one clock cycle, a program counter signal which is either a first, second, or third program counter signal according to whether two operand numbers M and N indicated by the instruction are (A)M=N, (B)M<N, or (C)M>N;

a program counter circuit
having an address pointer register storing a pointer number and operable in either (i) a default increment mode which normally increments the pointer number each clock cycle, (ii) a decrement mode which normally decrements the pointer number each clock cycle, and responsive to the program counter signal being either the first, second, or third program counter signal to accordingly (A) increment the pointer number, (B)

change the pointer number to a specified jump number and afterwards proceed in the decrement mode, or (C) change the pointer number to a specified jump number and afterwards proceed in the default increment mode;

whereby a single machine conditional jump instruction enables three alternatives: proceeding in the present block of instructions or jumping to a single new instruction address which begins either of two alternate blocks of new instructions.

2. A method of operating a program counter system regulated by a clock generating clock cycles in response to a conditional jump instruction indicating two operand numbers M and N, comprising the steps of:

provided a program counter circuit having an address pointer register storing a pointer number and operable in either (i) a default increment mode which normally increments the pointer number each clock cycle, (ii) a decrement mode which normally decrements the pointer number each clock cycle;

determining whether (A)M=N, (B)M<N, or (C)M>N; and accordingly instructing the program counter circuit (A) if M=N to increment the pointer number, (B) if M<N to change the pointer number to a specified jump number and afterwards proceed in the decrement mode or (C) if M>N to change the pointer number to a specified jump number and afterwards proceed in the default increment mode;

whereby a single machine conditional jump instruction enables three alternatives: proceeding in the present block of instructions or jumping to a single new instruction address which begins either of two alternate blocks of new instructions.

\* \* \* \* \*